United States Patent [19]

Botterman et al.

[11] Patent Number: 5,466,050
[45] Date of Patent: Nov. 14, 1995

[54] VEHICLE WHEEL AND ASSOCIATED METHODS OF MAKING A VEHICLE WHEEL

[75] Inventors: Ralph C. Botterman, Strongsville; Michael J. Doran, Lakewood, both of Ohio

[73] Assignee: Aluminum Company of America, Pittsburgh, Pa.

[21] Appl. No.: 214,640

[22] Filed: Mar. 16, 1994

Related U.S. Application Data

[63] Continuation-in-part of Ser. No. 927,947, Aug. 11, 1992, Pat. No. Des. 356,538, and a continuation-in-part of Ser. No. 927,948, Aug. 11, 1992, Pat. No. Des. 358,797, and a continuation-in-part of Ser. No. 1,806, Aug. 24, 1992, Pat. No. Des. 358,360, and a continuation-in-part of Ser. No. 1,807, Aug. 24, 1992, Pat. No. Des. 360,867, and a continuation-in-part of Ser. No. 16,870, Dec. 28, 1993, and a continuation-in-part of Ser. No. 19,091, Feb. 3, 1994, Pat. No. Des. 361,052.

[51] Int. Cl.$^6$ ........................................... B60B 3/10
[52] U.S. Cl. ............................................. 301/65; 301/64.1
[58] Field of Search .................................. 301/63.1, 64.1, 301/65, 62, 37.28

[56] References Cited

U.S. PATENT DOCUMENTS

| | | |
|---|---|---|
| D. 164,191 | 8/1951 | Lyon . |
| D. 218,930 | 10/1970 | Mitchell . |
| D. 232,930 | 9/1974 | Edwards . |
| D. 235,328 | 6/1975 | Scraver . |
| D. 235,432 | 6/1975 | May et al. . |
| D. 250,704 | 1/1979 | Taitani . |
| D. 262,616 | 1/1982 | Main . |
| D. 265,188 | 6/1982 | Reid . |
| D. 265,819 | 8/1982 | Reid . |
| D. 273,102 | 3/1984 | Woodward . |
| D. 282,835 | 3/1986 | Main . |
| D. 292,572 | 11/1987 | Schell et al. . |
| D. 318,449 | 7/1991 | Lipper . |
| 1,589,449 | 6/1926 | Williams . |
| 1,711,833 | 5/1929 | Crissman . |
| 2,354,439 | 7/1944 | Brink . |
| 2,631,897 | 3/1953 | Ewart ........................... 301/65 |
| 3,506,311 | 4/1970 | Nobach .................. 301/65 X |
| 3,718,958 | 5/1971 | Brucker . |
| 3,989,307 | 11/1976 | Reppert . |
| 4,105,255 | 8/1978 | Kopp ...................... 301/65 X |
| 4,165,131 | 8/1979 | Thompson . |
| 4,241,597 | 12/1980 | Golata et al. . |
| 4,317,597 | 3/1982 | Golata et al. . |
| 4,420,190 | 12/1983 | Rohr ....................... 301/65 X |
| 4,610,482 | 9/1986 | Overbeck et al. . |
| 4,634,379 | 1/1987 | Nash . |
| 4,800,686 | 1/1989 | Hirabayashi et al. . |
| 4,977,709 | 12/1990 | Siden . |
| 5,188,429 | 2/1993 | Heck et al. . |
| 5,350,220 | 9/1994 | Atwell, Jr. ................. 301/65 X |

FOREIGN PATENT DOCUMENTS

| | | |
|---|---|---|
| 383605 | 2/1931 | United Kingdom .............. 301/65 |
| 1387907 | 3/1975 | United Kingdom . |

OTHER PUBLICATIONS

Pp. 6W, 7W, 26 of "Tire Review"; May 1986; Advertisements.
Commercial Car Journal, May 1971, p. 124, Aluminum Disc Wheel, bottom center of page.
Austro Motor, Jun. 1980, Rear Cover, Wheel on Toyota Vehicle, bottom of page.

*Primary Examiner*—Russell D. Stormer
*Attorney, Agent, or Firm*—David V. Radack; Gary P. Topolosky

[57] ABSTRACT

A vehicle wheel having a hand hole extending from a first surface to a second surface. The hand hole has a zone of a minimum dimension intermediate the first surface and the second surface. The hand hole is preferably tapered from the first surface to the minimum dimension zone and tapered from the second surface to the minimum dimension zone. Associated methods of making the vehicle wheel are also provided.

15 Claims, 3 Drawing Sheets

VEHICLE WHEEL AND ASSOCIATED METHODS OF MAKING A VEHICLE WHEEL

CROSS-REFERENCE TO RELATED APPLICATIONS

This application is a continuation-in-part of the following applications: U.S. patent application Ser. No. 07/927,947 filed Aug. 11, 1992 now U.S. Pat. No. Des. 356,538; U.S. patent application Ser. No. 07/927,948 filed Aug. 11, 1992 now U.S. Pat. No. Des. 358,797; U.S. patent application Ser. No. 29/001,806 filed Aug. 24, 1992 now U.S. Pat. No. Des. 358,360; U.S. patent application Ser. No. 29/001,807 filed Aug. 24, 1992 now U.S. Pat. No. Des. 360,867; U.S. patent application Ser. No. 29/016,870 filed Dec. 28, 1993; and U.S. patent application Ser. No. 29/019,091 filed Feb. 3, 1994 now U.S. Pat. No. Des. 361,052. The disclosure of all of the above applications are specifically incorporated herein by reference.

BACKGROUND OF THE INVENTION

This invention relates to a vehicle wheel, and more particularly to a vehicle wheel having a hand hole extending from a first surface to a second surface of the vehicle wheel wherein the hand hole has a zone of a minimum dimension intermediate the first surface and the second surface.

A vehicle wheel is a circular frame adapted for mounting on the axle of a vehicle and which carries the tires of the vehicle. Vehicle wheels are made of metal, such as steel and aluminum. A vehicle wheel includes several openings, one of which is known to those skilled in the art as a "hand hole". The hand hole extends from the outer surface of the disc of the wheel to the inner surface of the disc of the wheel. The hand hole is used to provide a passageway for the tire valve in single and multiple wheel applications. The hand hole also provides a means for ventilating the vehicle's brake system.

Traditionally, the hand hole was drilled straight through the disc. This created a sharp corner formed by the surface of the disc and the inside wall surface of the opening. Because of this sharp corner, stress concentrations develop in the regions adjacent to the hand holes. These stress concentrations, if great enough, lead to cracking. Obviously, higher stress concentrations lead to shorter life of the vehicle wheel.

What is needed, therefore, is a vehicle wheel having hand holes that are designed to minimize stress concentrations so that the vehicle wheel has a longer operating life while at the same time providing aesthetic styling benefits.

SUMMARY OF THE INVENTION

The vehicle wheel of the invention has met the above need. The vehicle wheel of the invention has a hand hole extending from a first surface to a second surface. The hand hole has a zone of a minimum dimension intermediate the first surface and the second surface. In this way, stress concentrations in the regions adjacent to the hand hole will be minimized.

A method of making a vehicle wheel is also provided. The method comprises providing a workpiece generally in the shape of a vehicle wheel having at least one hand hole extending from a first surface of the wheel to a second surface of the wheel. The method then comprises reforming the hand hole to provide a zone of a minimum dimension intermediate the first surface and the second surface.

A further method of making a vehicle wheel is also provided comprising providing molten metal and casting the molten metal into a vehicle wheel having a hand hole extending from a first surface to a second surface. The hand hole has a zone of a minimum dimension intermediate the first surface and the second surface.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
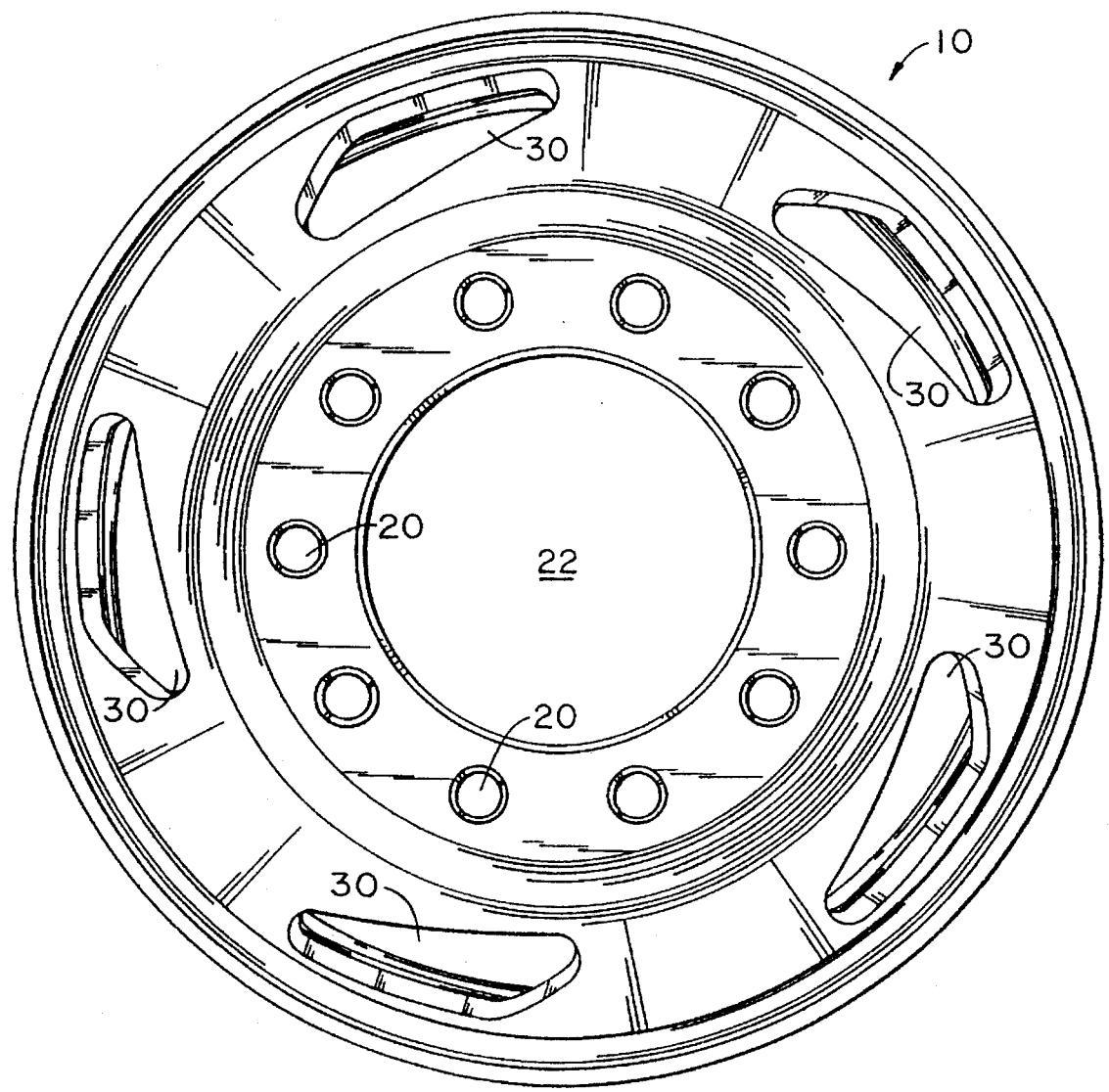
FIG. 1 is an elevational view of a vehicle wheel having a plurality of openings, some of which are formed in accordance with the invention.

Referring now to FIG. 1, a vehicle wheel 10 is shown. Vehicle wheel 10 is made of a forged aluminum alloy, preferably Aluminum Association designation 6061 aluminum alloy, and is designed for use with a heavy duty truck or bus. It will be appreciated, however, that the invention is not limited to truck vehicle wheels as other vehicle wheels, such as automobile, bus and trailer vehicle wheels, are within the purview of the invention. Similarly, the materials used for making the vehicle wheel 10 are not limited to forged aluminum alloy, but can also be cast aluminum alloy or further still can be made of other metals such as steel or magnesium alloy.

The vehicle wheel 10, as is well known, is adapted for mounting on the axle of a vehicle, such as a truck, and is designed to support the tires of the vehicle. The vehicle wheel 10 has formed therein a plurality (ten are shown in FIG. 1) of stud or bolt holes 20. These holes provide openings which are used to facilitate securement of the vehicle wheel to the axle of the truck. The vehicle wheel 10 also has formed therein a center hole 22 used for mounting the vehicle wheel 10 on the axle of the vehicle.

FIG. 1 also shows a plurality (five are shown) of hand holes 30 formed in accordance with the invention, as will be explained further hereinafter with respect to FIGS. 3 and 4. As is known, the hand holes 30 are used for access to the tire valve in single and multiple wheel applications. The hand holes also provide a means of ventilating the vehicle's brake system. The hand holes 30 also have an aesthetic function in the styling and design of the vehicle wheel.

Figure 2:
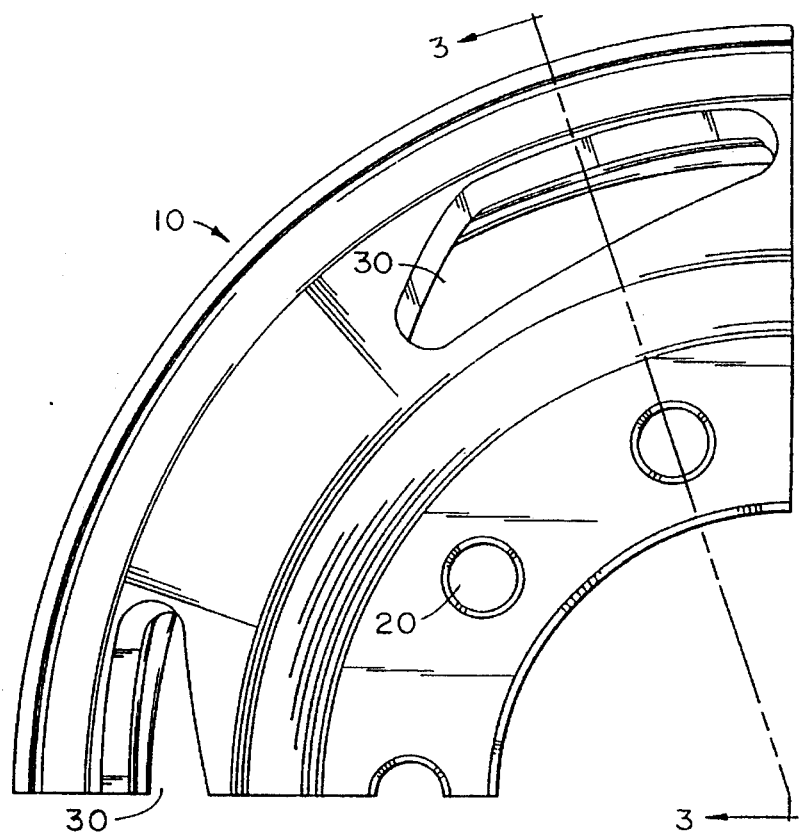
FIG. 2 is a partial elevational view showing the upper quadrant of the vehicle wheel shown in FIG. 1.
Figure 3:
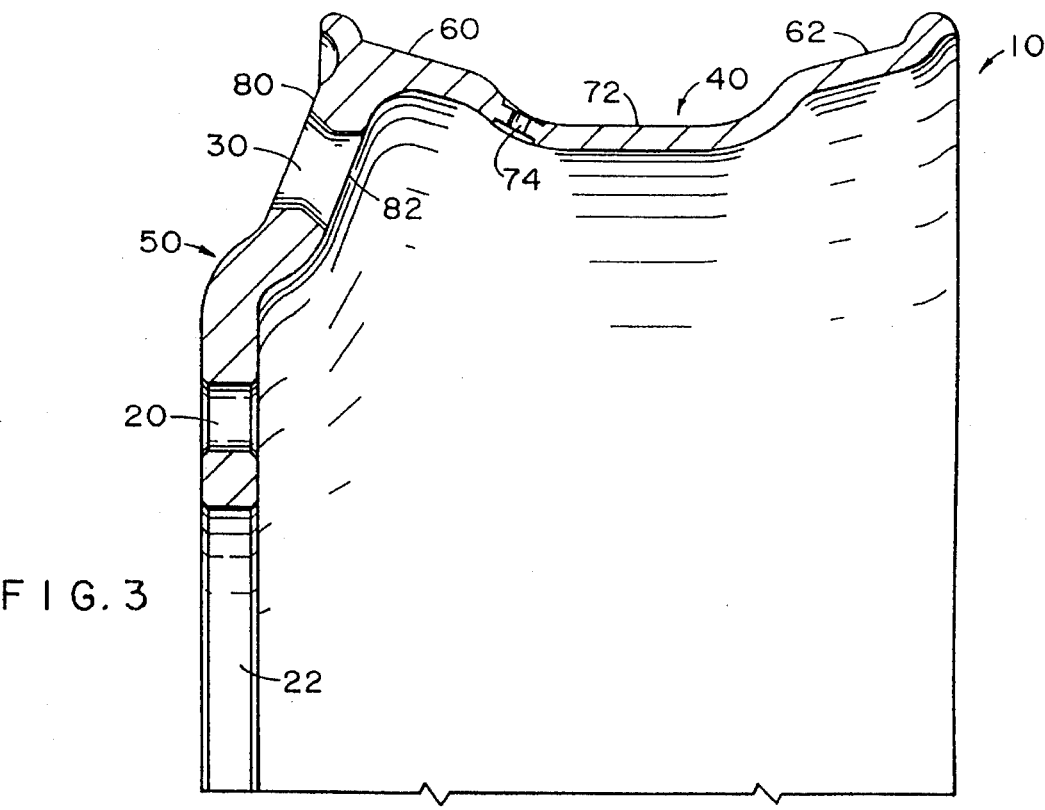
FIG. 3 is a cross-sectional view taken along line 3—3 of FIG. 2.

Referring now to FIG. 3, a cross-sectional view of a portion of the vehicle wheel 10 is shown. The vehicle wheel 10 consists of a rim 40 and a disc 50, which can each be separate components but which are shown in FIGS. 1–4 as being integrally formed. The rim 40 includes a pair of bead flanges 60, 62 which are positioned on the periphery of the rim 40. The rim 40 further includes bead seat radii 64, 66 and bead seat 68, 70. A drop well 72 is formed in the center of the rim 40. FIG. 3 also shows the valve hole 74 which can provide a passageway for the tire valve (not shown).

FIG. 3 also shows a cross-sectional view of the disc 50. Hand hole 30 is shown in cross-section, and will be described in detail hereinafter with respect to FIG. 4. A cross-sectional view of stud or bolt hole 20 is also shown. It will be appreciated that the hand hole 30 extends from the outside surface 80 of the disc 50 to the inside surface 82 of the disc 50. In this way, a passageway for the tire valve (not shown) is created so that access may be gained thereto in single and multiple wheel applications.

It will be appreciated that although the hand hole 30 at the outside surface and the inside surface are shown in FIGS. 2 and 3 as being triangular in shape, other shapes for the hand hole can be used, including but not limited to the following shapes: a circle, an oval, an ellipse, a diamond, a rectangle or a crescent. These shapes are disclosed and claimed in six separate U.S. patent applications which are all expressly incorporated by reference herein. Those applications are as follows: U.S. patent application Ser. No. 07/927,947 filed Aug. 11, 1992; U.S. patent application Ser. No. 07/927,948 filed Aug. 11, 1992; U.S. patent application Ser. No. 29/001,806 filed Aug. 24, 1992; U.S. patent application Ser. No. 29/001,807 filed Aug. 24, 1992; U.S. patent application Ser. No. 29/016,870 filed Dec. 28, 1993; and U.S. patent application Ser. No. 29/019,091 filed Feb. 3, 1994.

Figure 4:
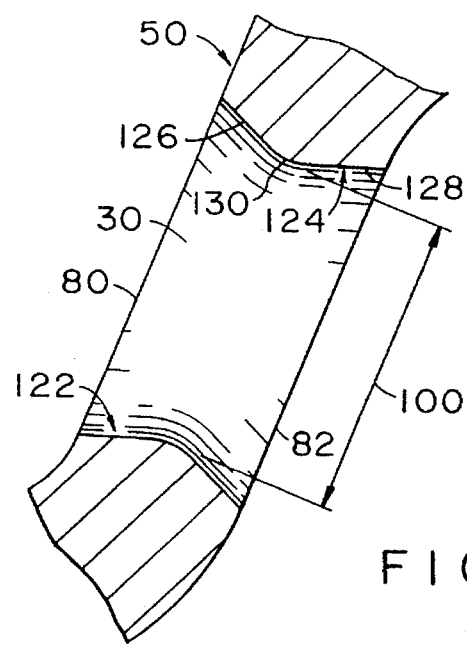
FIG. 4 is a detailed cross-sectional view of the hand hole in the vehicle wheel shown in FIG. 3.

Referring now to FIG. 4, a detailed cross-sectional view of hand hole 30 shown in FIG. 3 is shown. As can be seen, hand hole 30 extends from the outside surface 80 of the disc 50 to the inside surface 82 of the disc 50. Intermediate the outside surface 80 and the inside surface 82 is a zone of a minimum dimension 100, which in this embodiment is disposed about one-half of the distance between the outside surface 80 and the inside surface 82. It will be appreciated that the minimum dimension zone 100 is not limited to being disposed one-half of the distance between the outside surface 80 and the inside surface 82, but can be disposed in any position intermediate the outside surface 80 and the inside surface 82.

The hand hole 30 is also shown in FIG. 4 as being generally symmetrical about the zone of minimum dimension 100, but the invention is not limited to this particular embodiment.

The hand hole 30 is defined by a generally continuous wall 120, the generally continuous wall having an outside section 122 that extends from the outside surface 80 to the minimum dimension zone 100 and an inside section 124 that extends from the inside surface 82 to the minimum dimension zone 100. As can be seen in FIG. 4, the outside section 122 tapers from the outside surface 80 to the minimum dimension zone 100 and the inside section 124 tapers from the inside surface 82 to the minimum dimension zone 100. Furthermore, the line $l_1$ used to generate the outside section 122 is generally straight and the $l_2$ used to generate the inside section is also generally straight. It will be appreciated, however, that the outside section 122 and the inside section 124 can be an arcuate surface.

The portion of the outside section 122 along $l_1$ is the generally straight outside portion 126 and the portion of the inside section 124 along $l_2$ is generally straight inside portion 128. Outside portion 126 and inside portion 128 are joined by intersection zone 130. The intersection zone 130 is generally arcuate and more particularly is formed as the arc of a circle. This is done in order to eliminate sharp corners which will in turn reduce stress concentrations. It will be appreciated that the intersection zone 130 can also be a generally straight line, with a small contoured edge at the intersection of intersection zone and the straight outside portion and the intersection of intersection zone and the straight inside portion to take away the sharpness of the intersection point.

Figure 5:
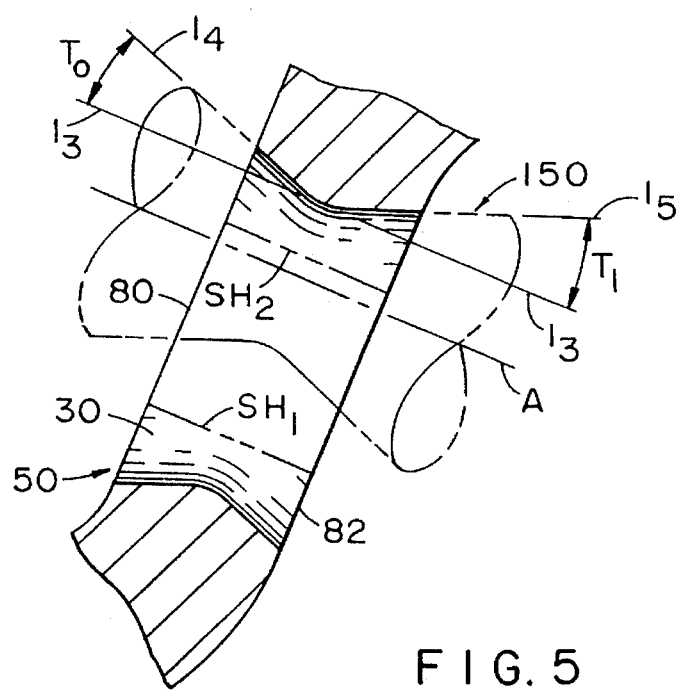
FIG. 5 is a view similar to that shown in FIG. 4 only showing the machine tool used to shape the hand hole.

Referring to FIG. 5, a machine tool 150 used to form the shape of the hand hole 30 is shown. The machine tool 150 is adapted to be mounted to a rotary drive unit (not shown) and rotates about an axis, A. After a straight hole (defined by lines $SH_1$ and $SH_2$ in phantom line drawing on FIG. 5) is drilled into the disc 50, the machine tool 150 is used to create the final shape of the hand hole 30. It will be appreciated that the straight hole can also be either directly forged or cast as opposed to initially drilling a straight hole. It will also be appreciated that the hole can be machined or punched. The machine tool 150 is moved around the periphery of the hand hole (following the shape of the hand hole, which in the case of FIG. 5 is triangular) to form the same. It will be appreciated that the machine tool 150 forms a double taper shape. The angle of the taper in the outside section 122 is determined by the taper angle of the machine tool 150. The taper angle of the machine tool 150 is determined by measuring the angle $T_o$ formed by a line $l_3$ which is parallel to the rotating axis A of the machine tool 150 and the line $l_4$ which forms the outside edge of the machine tool 150. The rotating axis A is perpendicular to the plane formed at the zone of the minimum dimension 100. As shown in FIG. 5, this angle $T_o$ is about 20°. Similarly, the taper angle $T_1$ of the inside section 124 is determined by measuring the angle between line $l_5$ which forms the outside edge of the machine tool 150 and line $l_3$. As shown in FIG. 5, this angle $T_1$ is about 20°. It will be appreciated that the taper angles $T_o$ and $T_1$ can vary from greater than 0° and less than 90°. Thus, the tapering angle of the outside section 122, which is formed by a plane perpendicular to the plane formed at the minimum dimension zone 100 and the outside section 122, can vary between greater than 0° and less than 90° and the tapering angle of the inside section 124, which is formed by a plane perpendicular to the plane formed at the minimum dimension zone 100 and the inside section 124 can vary between greater than 0° and less than 90°.

The following dimensions for the hand hole shown in FIG. 4 are set forth as an example of a particular embodiment, although it is to be understood that any practical dimensions, dependent upon the wheel design, for the hand hole can be used. The disc 50 can be up to one inch thick in the region where the hand hole is formed. The intersection zone 130 is formed as an arc of circle having a radius of about one-half of an inch. The arc of the included angle is approximately 20° and the arcuate intersection zone is about one-half of an inch. The generally straight inside portion 128 and the generally straight outside portion 126 are approximately ⅜ of an inch.

The hand hole 30 design in accordance with the invention reduces the stress concentration fields in the areas adjacent to the hand holes 30 in comparison to conventional hand holes which are drilled straight through the vehicle wheel disc. This reduces the possibility of cracks forming around the hand holes which will, in turn, increase the useful life of the vehicle wheel. In addition, the hand hole in accordance with design machines away more metal in the hand hole 30 region thus leading to a weight reduction in the vehicle wheel as compared to conventional hand holes which are drilled straight through the vehicle wheel disc. The hand holes of the invention also have an aesthetic function in the styling and design of the vehicle wheel.

One method of making the vehicle wheel involves providing a forged aluminum alloy workpiece in the form of the vehicle wheel and reforming at least one of the hand holes in accordance with the invention. The reforming of at least one of the hand holes can be accomplished by using a standard drill to drill a straight hole through the disc of the workpiece and then using the double tapered machine tool 150 shown in FIG. 4 for machining the hand hole in accordance with the invention. The straight hole can also be punched or machined. In this way, a hand hole in the vehicle wheel is formed which extends from a first surface of the disc of the workpiece to a second surface of the disc of the workpiece. The hand hole has a minimum dimension zone intermediate the first and second surfaces. It will be appreciated that the hand hole at the first and second surface can be a shape selected from the group consisting of a circle, a triangle, an oval, an ellipse, a diamond, a rectangle and a crescent as was shown in the U.S. patent applications cited in the Cross-Reference section above, and which are expressly incorporated by reference herein. It will be appreciated that other shapes can be used for the hand hole at the first and second surface and still be within the purview of the invention and the listing of the above shapes in no way limits the shapes that can be used.

The drilling of the hole and the machining of the hand hole in the workpiece can also be accomplished by using a single tool. The single tool has a cutting surface to machine the straight hole through the disc and cutting surfaces to machine the opening in accordance with invention.

The vehicle wheel can also be made by providing a molten metal, such as A356 aluminum alloy, and casting the molten metal into a vehicle wheel having a hand hole which extends from a first surface of the vehicle wheel to a second surface of the vehicle wheel. The hand hole has a zone of a minimum dimension intermediate the first and second surface.

It will be appreciated that a vehicle wheel is provided that has a hand hole extending from a first surface to a second surface, the hand hole having a zone of minimum dimension intermediate the first surface and the second surface. The design of the hand hole reduces the stress concentration fields in the areas adjacent thereto in comparison to conventional hand holes which are drilled straight through the vehicle wheel. A method of making a vehicle wheel by forging an aluminum alloy and a method of making a vehicle wheel by casting an aluminum alloy are also provided.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A vehicle wheel having a hand hole extending from a first surface to a second surface wherein said hand hole has a zone of a minimum dimension intermediate said first surface and said second surface, said hand hold being defined by a generally continuous wall which has a first section that extends from said first surface to said minimum dimension zone and a second section that extends from said second surface to said minimum dimension zone, said first section tapering from said first surface to said minimum dimension zone and said second section tapering from said second surface to said minimum dimension zone with the lines used to generate said first and second sections being generally straight and intersecting at an intersection region which is generally arcuate in shape.

2. The vehicle wheel of claim 1, wherein
the location of said minimum dimension zone is generally one-half the distance between said first surface and said second surface.

3. The vehicle wheel of claim 1, wherein said intersection region is an arc of a circle.

4. The vehicle wheel of claim 1, wherein
said hand hole at said first surface has a shape selected from the group consisting of a circle, a triangle, an oval, an ellipse, a diamond, a rectangle and a crescent.

5. The vehicle wheel of claim 1, wherein
said hand hole at said second surface has a shape selected from the group consisting of a circle, a triangle, an oval, an ellipse, a diamond, a rectangle and a crescent.

6. The vehicle wheel of claim 1, wherein
said vehicle wheel has the property of a lower stress concentration field in regions adjacent said hand hole than the stress concentration field in regions adjacent of a hand hole in a vehicle wheel in which the hand hole is not so tapered.

7. The vehicle wheel of claim 1, wherein
said vehicle wheel is made of aluminum alloy.

8. The vehicle wheel of claim 7, wherein
said aluminum alloy is 6061 aluminum alloy.

9. The vehicle wheel of claim 1, wherein
said hand hole at said first surface and said second surface are circular in shape.

10. The vehicle wheel of claim 1, wherein
said hand hole at said first surface and said second surface are triangular in shape.

11. The vehicle wheel of claim 1, wherein
said hand hole at said first surface and said second surface are oval in shape.

12. The vehicle wheel of claim 1, wherein
said hand hole at said first surface and said second surface are elliptical in shape.

13. The vehicle wheel of claim 1, wherein
said hand hole at said first surface and said second surface are diamond shaped.

14. The vehicle wheel of claim 1, wherein
said hand hole at said first surface and said second surface are rectangular in shape.

15. The vehicle wheel of claim 1, wherein
said hand hole at said first surface and said second surface are crescent shaped.

* * * * *